United States Patent
Ifrim

(10) Patent No.: US 6,900,570 B2
(45) Date of Patent: May 31, 2005

(54) FIELD CONTROLLED PERMANENT MAGNET BRUSHLESS ELECTRIC MACHINE

(75) Inventor: Costin Ifrim, Hamden, CT (US)

(73) Assignee: Ecoair Corp., Hamden, CT (US)

( * ) Notice: Subject to any disclaimer, the term of this patent is extended or adjusted under 35 U.S.C. 154(b) by 129 days.

(21) Appl. No.: 10/130,225

(22) PCT Filed: Dec. 1, 2000

(86) PCT No.: PCT/US00/42481

§ 371 (c)(1),
(2), (4) Date: May 31, 2002

(87) PCT Pub. No.: WO01/42649

PCT Pub. Date: Jun. 14, 2001

(65) Prior Publication Data

US 2002/0180297 A1 Dec. 5, 2002

Related U.S. Application Data

(60) Provisional application No. 60/168,995, filed on Dec. 3, 1999, and provisional application No. 60/202,973, filed on May 9, 2000.

(51) Int. Cl.$^7$ ................................................ H02K 1/00
(52) U.S. Cl. ...................... 310/190; 310/180; 310/209; 310/263
(58) Field of Search ................................ 310/190–191, 310/180, 181, 209, 156.55–156.59, 90, 263; H02K 21/12, 21/00, 1/22, 1/00

(56) References Cited

U.S. PATENT DOCUMENTS

| | | | | |
|---|---|---|---|---|
| 3,411,027 A | * | 11/1968 | Rosenberg .................. | 310/181 |
| 3,484,635 A | | 12/1969 | MacKallor, Jr. ............ | 310/266 |
| 3,555,327 A | * | 1/1971 | Terry .......................... | 310/263 |
| 3,858,071 A | | 12/1974 | Griffing et al. ............. | 310/266 |
| 4,307,309 A | | 12/1981 | Barrett ........................ | 310/166 |
| 4,709,179 A | * | 11/1987 | Banon et al. ........... | 310/156.55 |
| 4,714,854 A | | 12/1987 | Oudet ......................... | 310/268 |
| 4,829,205 A | | 5/1989 | Lindgren .................... | 310/166 |
| 4,831,300 A | | 5/1989 | Lindgren .................... | 310/190 |
| 4,835,431 A | | 5/1989 | Lindgren .................... | 310/254 |
| 5,828,155 A | * | 10/1998 | Adachi et al. .............. | 310/263 |
| 6,066,908 A | | 5/2000 | Woodward, Jr. ............ | 310/268 |
| 6,236,134 B1 | * | 5/2001 | Syverson .................... | 310/181 |

* cited by examiner

Primary Examiner—Burton S. Mullins
Assistant Examiner—Karen B Addison
(74) Attorney, Agent, or Firm—Raymond A. Nuzzo

(57) ABSTRACT

A brushless electric machine comprising a housing fabricated from a magnetically permeable material and having an interior region, a stator mounted within the interior region and attached to the housing wherein the stator has a stator winding, a rotor mounted for rotation about a rotational axis within the stator. The rotor comprises a plurality of magnetic pole pieces and permanent magnets circumferentially arranged in an alternating configuration such that each permanent magnet is positioned intermediate a pair of consecutive magnetic pole pieces and the axis of magnetization lies in the plane of rotation of the rotor. The rotor is separated from the stator windings by a first air gap so as to form a first magnetic circuit. The rotor further comprises a first side, a first rotor end cap attached to the first side, a second side, and a second rotor end cap attached to the second side. Each rotor end cap contacts at least some of the magnetic pole pieces. Each rotor end cap is fabricated from a magnetically permeable material. The burshless electric machine further comprises a pair of excitation windings. Each excitation winding is secured to the housing on either side of the rotor such that the excitation winding extends circumferentially in the plane of rotation of the rotor and about a corresponding rotor end cap. The excitation windings are separated from the rotor end caps by a second air gap. The first and second air gaps cooperate to form a second magnetic circuit.

11 Claims, 5 Drawing Sheets

FIELD CONTROLLED PERMANENT MAGNET BRUSHLESS ELECTRIC MACHINE

This application is a 371 of PCT/US00/42451 Dec. 1, 2000 which claims benefit of provisional appln 60/168,995, Dec. 3, 1999 and provisional appln 60/202,973, May 9, 2000.

TECHNICAL FIELD

The present invention generally relates to electric machines that are used to provide electrical power. In particular, the present invention relates to alternators of the type that are used in vehicles to provide electrical power for running accessories and charging batteries.

1. Background Art

Many prior art alternators utilize excitation windings that are positioned on the alternator rotor. Such a configuration limits the number of possible ways that permanent magnets can be positioned on the rotor. Furthermore, such configurations typically utilize brushes which increase manufacturing costs and create problems relating to brush wear and replacement. Other prior art alternators use excitation windings attached to the stator with a magnetic circuit closed outside the rotor. Such a prior art configuration is known in the art as a Lundell brushless magnetic circuit.

2. Discount of the Invention

The present invention is directed to a novel alternator wherein only permanent magnets are positioned on the rotor. The excitation windings are not positioned on the rotor but instead, are attached to the interior of the alternator housing. Such a configuration results in a brushless alternator. Several important features of the alternator of the present invention are:

1) both permanent magnets and excitation windings are utilized to produce a combined and controllable variable flux in the stator windings (the induced stator);

2) brushes are not required thereby eliminating the aforementioned problems associated with brushes;

3) an induced magnetic field produced by the permanent magnets and an induced magnetic field produced by the excitation windings have a common magnetic path only inside the stator, i.e. the magnetic flux produced by the excitation windings does not pass through the permanent magnet, and the magnetic flux produced by the magnets does not form a loop surrounding the excitation windings;

4) the flux path of the excitation winding magnetic circuit is perpendicular to the flux path of the permanent magnet circuit everywhere except in the induced stator; and 5) the flux produced by the excitation windings passes only through two air gaps compared to four in the brushless Lundell-type alternator.

In one aspect, the present invention is directed to a brushless electric machine, comprising a housing fabricated from a magnetically permeable material and having an interior region, a stator mounted within the interior region and attached to the housing wherein the stator has a stator winding, a rotor mounted for rotation about a rotational axis within the stator wherein the rotor comprises a plurality of magnetic pole pieces and permanent magnets circumferentially arranged in an alternating configuration such that each permanent magnet is positioned intermediate a pair of consecutive magnetic pole pieces and the axis of magnetization lies in the plane of rotation of the rotor. The rotor is separated from the stator windings by a first air gap so as to form a first magnetic circuit. The rotor further comprises a first side, a first rotor end cap attached to the first side, a second side, and a second rotor end cap attached to the second side. Each rotor end cap contacting at least some of the magnetic pole pieces. Each rotor end cap is fabricated from a magnetically permeable material. The brushless electric machine further comprises a pair of excitation windings. Each excitation winding is secured to the housing on either side of the rotor such that the excitation winding extends circumferentially in the plane of rotation of the rotor and about a corresponding rotor end cap. The excitation windings are separated from the rotor end caps by a second air gap. The first and second air gaps cooperate to form a second magnetic circuit.

In another aspect, the present invention is directed to a brushless electric machine, comprising a housing fabricated from a magnetically permeable material and having an interior region, a stator mounted within the interior region and attached to the housing wherein the stator has a stator winding, and a rotor mounted for rotation about a rotational axis and spaced apart from the stator windings by an air gap. The rotor comprises a pair of magnetically permeable claw poles. Each claw pole comprises a body portion having a circumference and fingers that extend axially from the circumference of the body portion and intermesh with the fingers of the other claw pole. The rotor further comprises a plurality of permanent magnets and a plurality of internal pole pieces intermediate the claw poles and circumferentially arranged in an alternating configuration such that each permanent magnet is positioned intermediate a pair of consecutive internal pole pieces. The arrangement of the permanent magnets and internal pole pieces define an outer rotor perimeter and a central opening for receiving a shaft about which the rotor rotates. The plurality of internal pole pieces comprise a first group of internal pole pieces that are attached to one of the claw poles and a second group of internal pole pieces that are attached to the other claw pole,. The claw poles are magnetically isolated from the permanent magnets. The fingers of each claw pole are intermediate the stator and the outer rotor perimeter. The brushless electric machine further comprises a pair of excitation windings. Each excitation winding is secured to the housing on either side of the rotor such that the excitation winding extends circumferentially in the plane of rotation of the rotor. The excitation windings are separated from the claw poles by an air gap.

MODE FOR CARRYING OUT THE INVENTION

Figure 1:
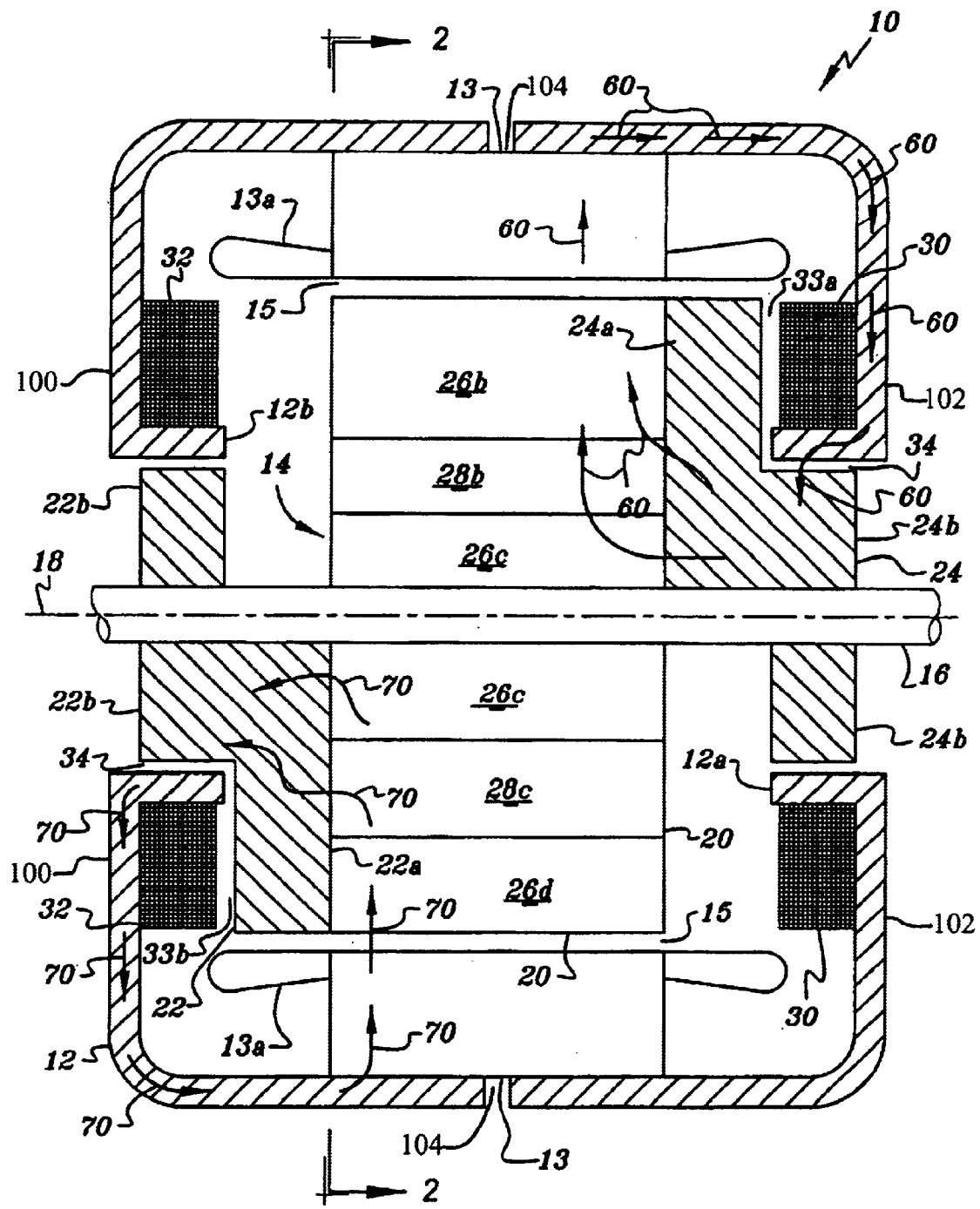
FIG. 1 is a front-elevational view, partially in cross-section of the alternator of the present invention.
Figure 2:
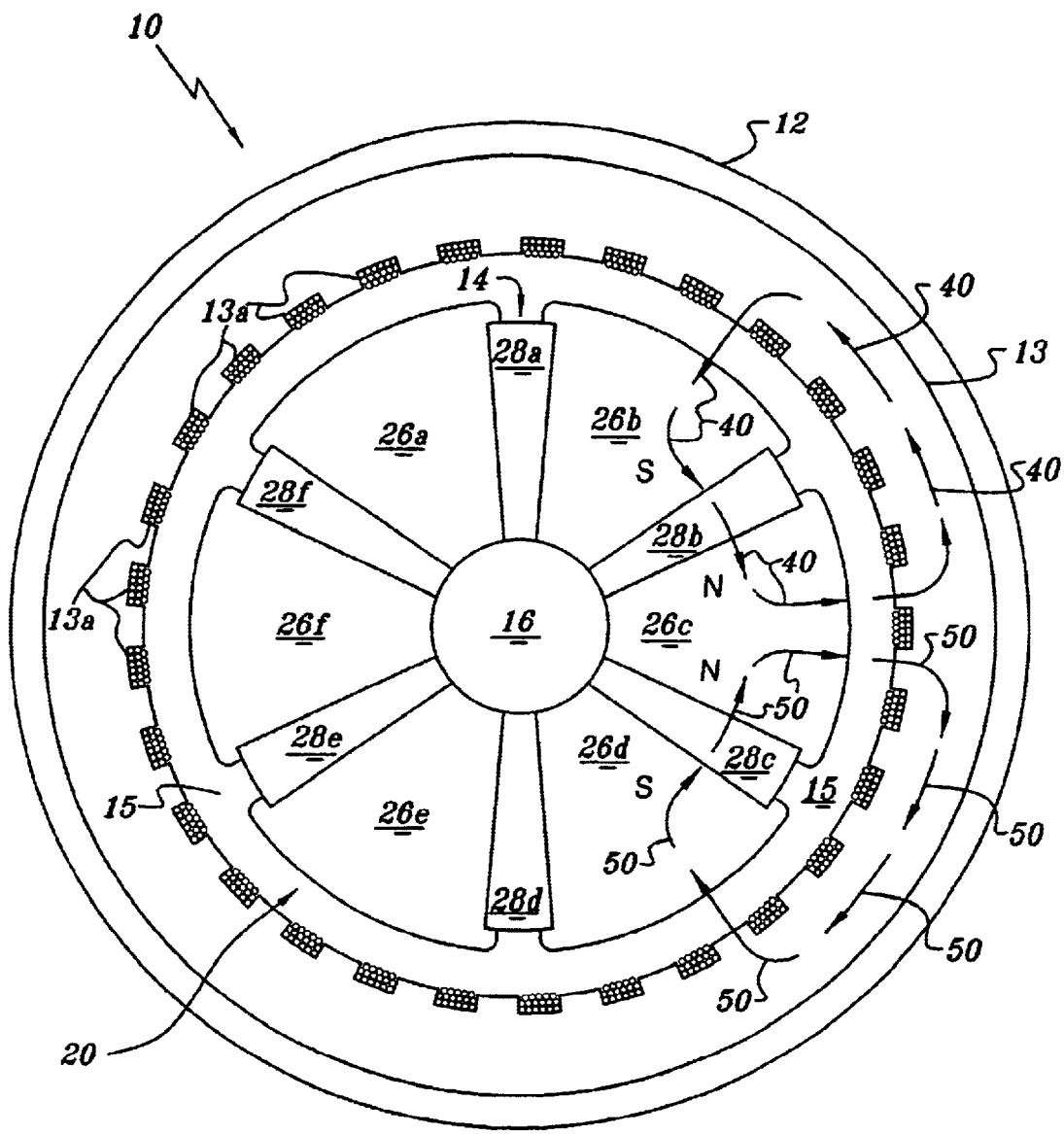
FIG. 2 is a view taken along line 2—2 of FIG. 1.
Figure 2A:
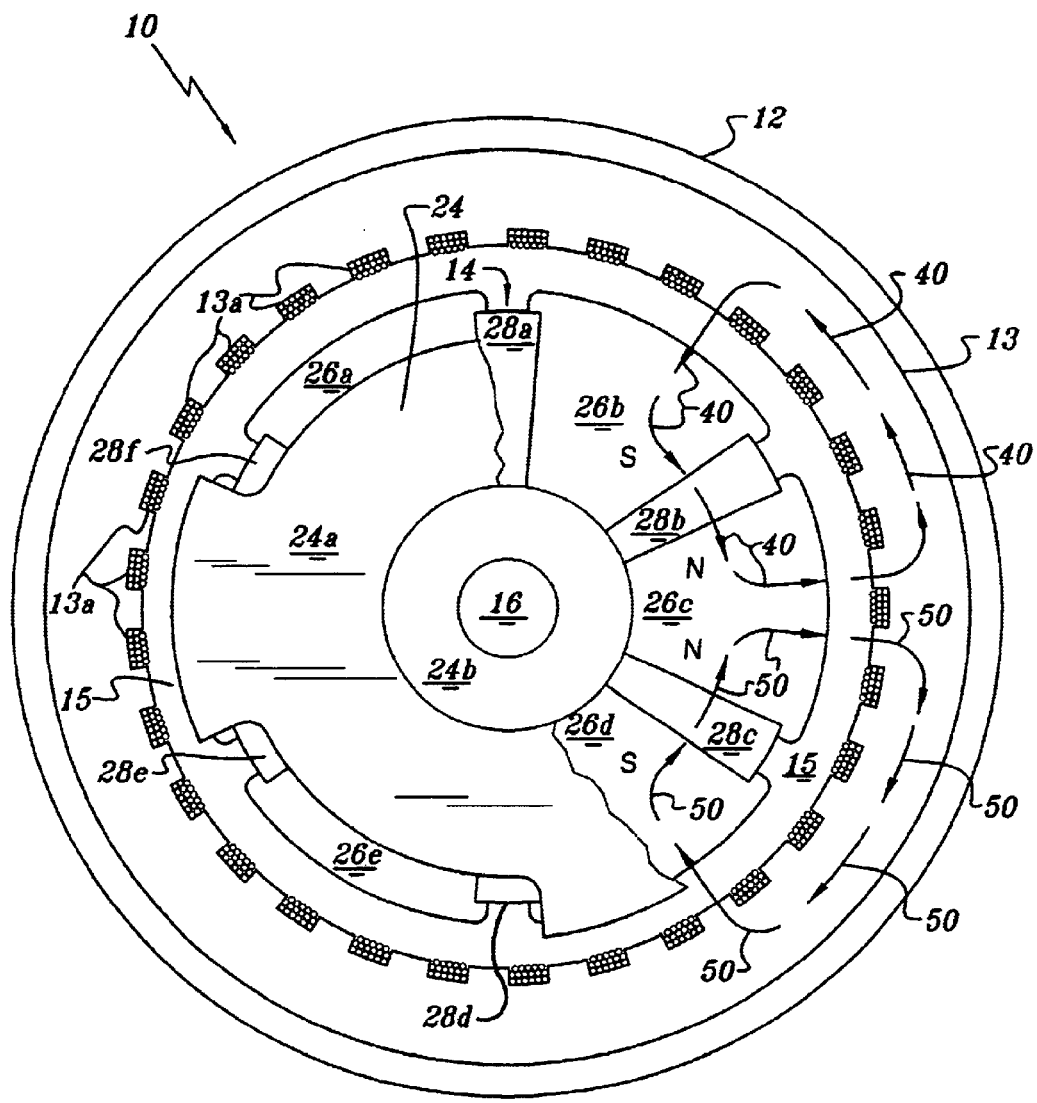
FIG. 2a is a side elevational view of the rotor depicted in FIG. 1.

Referring to FIGS. 1 and 2, there is shown field controlled permanent magnet brushless alternator 10 of the present invention. Alternator 10 generally comprises housing 12, stator section 13 and a rotor section, generally indicated by numeral 14. Housing 12 comprises two halves 100 and 102 which are separated by space 104. The purpose of this particular housing structure will be apparent from the ensuing description. Air gap 15 separates stator section 13 and rotor section 14. In one embodiment, housing 12 is fabricated from magnetically permeable material. Stator section 13 is attached to the interior wall of housing 12 and has stator winding 13a. Alternator 10 includes shaft 16 which rotates about axis 18. Rotor section 14 is mounted to shaft 16. Thus, rotor section 14 rotates with respect to stator section 13. Rotor section 14 comprises a substantially cylindrical center section 20, rotor end cap 22, and rotor end cap 24. In one embodiment of a six pole configuration, center section 20 generally comprises six (6) magnetic pole pieces 26a–26f (see FIG. 2) and six (6) permanent magnets 28a–28f arranged in an alternate fashion as shown in FIG. 2. Magnetic pole pieces 26a–26f are fabricated from magnetically permeable materials. In one embodiment, permanent magnets 28a–28f are configured as ferrite magnets. In another embodiment, permanent magnets 28a–28f are configured as rare earth magnets. It is to be understood that although the foregoing description is in terms of six poles, there can be less than or more than six poles.

It has been technically proved that a relatively high-power alternator can be realized by maximizing the magnetic flux that is crossing air gap 15. This concept is embodied within the design of the alternator of the present invention as will be apparent from the ensuing description.

Referring to FIG. 1, rotor end caps 22 and 24 are identically constructed and are fabricated from a magnetically permeable material. Rotor end caps 22 and 24 are positioned on opposite sides of center portion 20 and circumferentially shifted with respect to each other by one pole pitch. End cap 22 includes portions 22a and 22b. Portion 22a is attached to rotor center portion 20 and contacts a predetermined number of magnetic poles pieces 26a–26f and permanent magnets 28a–28f. Portion 22b is spaced apart from rotor section 14 and circumferentially extends about shaft 16. Similarly, cap 24 includes portions 24a and 24b. Portion 24a is attached to center portion 20 and contacts a predetermined number of magnetic poles pieces 26a–26f and permanent magnets 28a–28f. Portion 24b is spaced apart from rotor section 14 and circumferentially extends about shaft 16. The entire rotor section 14 (i.e. center section 20 and end caps 22, 24) rotates inside of housing 12.

Referring to FIG. 1, alternator 10 further includes excitation windings 30, 32. Excitation windings 30, 32 comprise circular coils that are wound on lip portions 12a, 12b, respectively, of the interior wall of housing 12 and thus, do not rotate. Windings 30 and 32 circumferential extend about rotor end cap portions 24b and 22b, respectively. Windings 30 and 32 produce a second magnetic circuit for rotor 14. (Windings 30, 32 lie in the plane of FIG. 2 but are only shown in FIG. 1.) Winding 30 is separated from end cap portion 24a by axial air gap 33a. Similarly, winding 32 is separated from end cap portion 22a by axial air gap 33b. Air gaps 33a and 33b extend in a direction that is generally parallel to rotational axis 18.

Referring to FIG. 1, magnetic pole pieces 26a–26f carry magnetic flux from permanent magnets 28a–28f and from excitation windings 30 and 32. The flux from excitation windings 30 and 32 is carried to the magnetic pole pieces 26a–26f by end caps 22 and 24 and through air gaps 34. Air gap 34 extends in a direction that is generally perpendicular to rotational axis 18. These characteristics will be described below in detail.

Referring to FIG. 2, permanent magnets 28a–f are arranged such that the axis of magnetization lies in the plane of FIG. 2 (i.e. in the plane of rotation of rotor section 14). Permanent magnets 28a–f are installed in alternating orientations such that magnetic flux flows: (i) from a first permanent magnet, (ii) then into an adjacent pole piece (e.g. pole piece 26a–26f), (iii) across air gap 15, (iv) through the back iron portion of stator section 13, (v) back across air gap 15, and (vi) into the pole piece that is on the other side of the first permanent magnet wherein it returns to the aforementioned first permanent magnet. This is illustrated in FIG. 2 wherein the flux is represented by arrows 40. Specifically, the flux flows from magnet 28b into pole piece 26c and then upwards across the air gap 15. The flux then flows through the back iron portion of stator section 13 and then back across air gap 15 and into adjacent pole piece 26b where it then returns to permanent magnet 28b. Adjacent permanent magnet 28c also produces a magnetic flux. This flux is represented by arrows 50 and flows in the same plane as flux 40 but circulates in the opposite direction. This is illustrated in FIG. 2. The flux flows from magnet 28c into pole piece 26c and then upwards across the air gap 15. The flux then flows through the back iron portion of stator section 13 and then back across air gap 15 and into adjacent pole piece 26d where it then returns to permanent magnet 28c. As a result of such a configuration, the orientation or direction of the flux paths (e.g. flux paths 40 and 50) alternate along the circumference of rotor section 14.

Referring to FIG. 1, excitation windings 30, 32 produce a second magnetic circuit for rotor section 14. Windings 30 and 32 produce a flux, represented by arrows 60 and 70, respectively, which flow in the plane of FIG. 1. In other words, the flux represented by arrows 60 and 70 flow in a plane that is perpendicular to the plane of FIG. 2 (e.g. the flux indicated by arrows 60 and 70 flows in a plane that is perpendicular to the plane of rotation of rotor section 14). The direction of the flux is controlled by the direction of the current crossing the windings 30 and 32. However, the magnetic flux represented by arrows 60 and 70 still crosses air gap 15 and either adds to or subtracts from the magnetic flux produced by the permanent magnets as necessary to supplement or diminish, respectively, the magnetic flux depending upon the speed of the alternator and the output voltage requirement.

Due to the characteristics of permanent magnets 28a–28f, the flux from the excitation windings 30 and 32 has a negligible component passing through permanent magnets 28a–28f. Furthermore, pole pieces 26a–26f receive flux from both permanent magnets 28a–28f and from the surrounding excitation windings 30 and 32.

Figure 3:
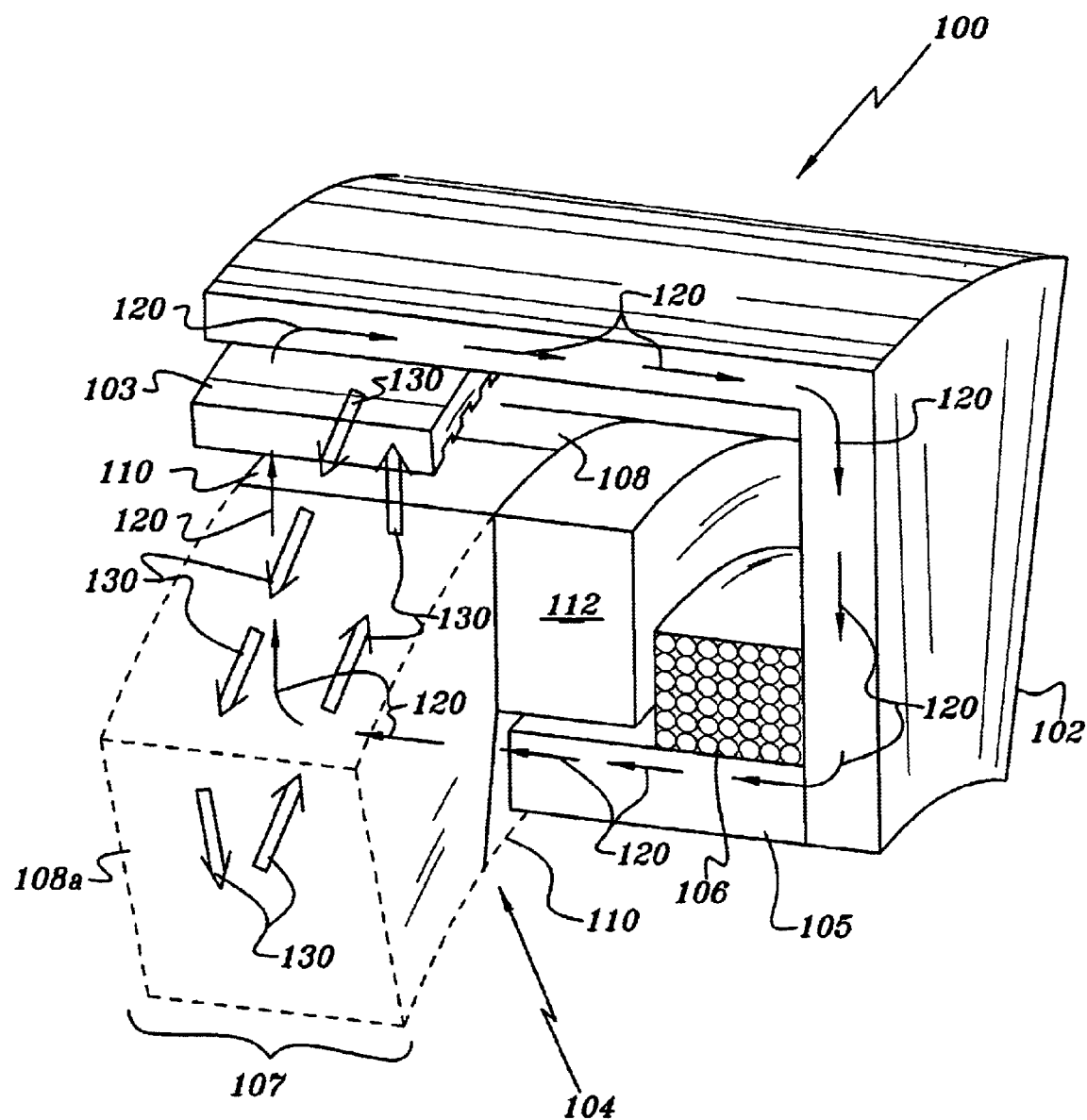
FIG. 3 is a perspective view of a quadrant of an alternate embodiment of the alternator of the present invention.

Referring to FIG. 3, there is shown a perspective view of one quadrant of an alternate brushless alternator of the present invention. Alternate alternator 100 generally comprises housing 102, stator section 103 and rotor section 104 which function in the same manner as housing 12, stator section 13 and rotor section 14, respectively, previously discussed in the foregoing description. Housing 102 includes lip 105 that circumferentially extends around a shaft (not shown) about which rotor section 104 rotates. Alternator 100 further includes excitation winding 106 that functions in the same manner as excitation windings 30 and 32 discussed in the foregoing description. Rotor section 104 has center section 107 which is comprised of permanent magnets 108 and pole pieces 110 arranged in an alternating orientation in the same manner as magnets 28a–28f and pole pieces 26a–26f discussed in the foregoing description. Magnet 108a is shown in phantom. Magnets 108 and pole pieces 110 are generally the same in construction as magnets 28a–28f and pole pieces 26a–26f, respectively, previously discussed in the foregoing description. An air gap (not shown) similar to air gap 15 (see FIG. 1) exists between stator section 103 and rotor section 104. Rotor section 104 further includes a pair of identically constructed extending sections, one of which being indicated by numeral 112, the other extending section not shown. Magnets 108 and pole pieces 110 are positioned between extending section 112 and the other extending section that is not shown. Although the ensuing description pertains to extending section 112, it is to be understood that such description applies to the extending section that is not shown. In one embodiment, extending section 112 circumferentially extends about the circumference of rotor section 104. In one embodiment, extending section 112 is configured as an annular or disk-shaped member comprising a body portion that circumferentially extends about lip 105. Extending section 112 is fabricated from magnetically permeable material. Extending section 112, as well as the extending section not shown, are attached to pole pieces 110. In an alternate embodiment, poles pieces 110 and extending section 112 (as well as the extending section not shown) are integrally formed as one piece. The flux produced from winding 106 is indicated by arrows 120 and lies in a plane that is perpendicular to the plane of rotation of rotor section 104. The flux from permanent magnet 108a is indicated by arrows 130 and lies in the same plane as the plane of rotation of the rotor section 104. Thus, the magnetic circuits are perpendicular to one another and share the pole piece, but flux from the permanent magnet does not pass through the winding or visa versa.

Figure 4:
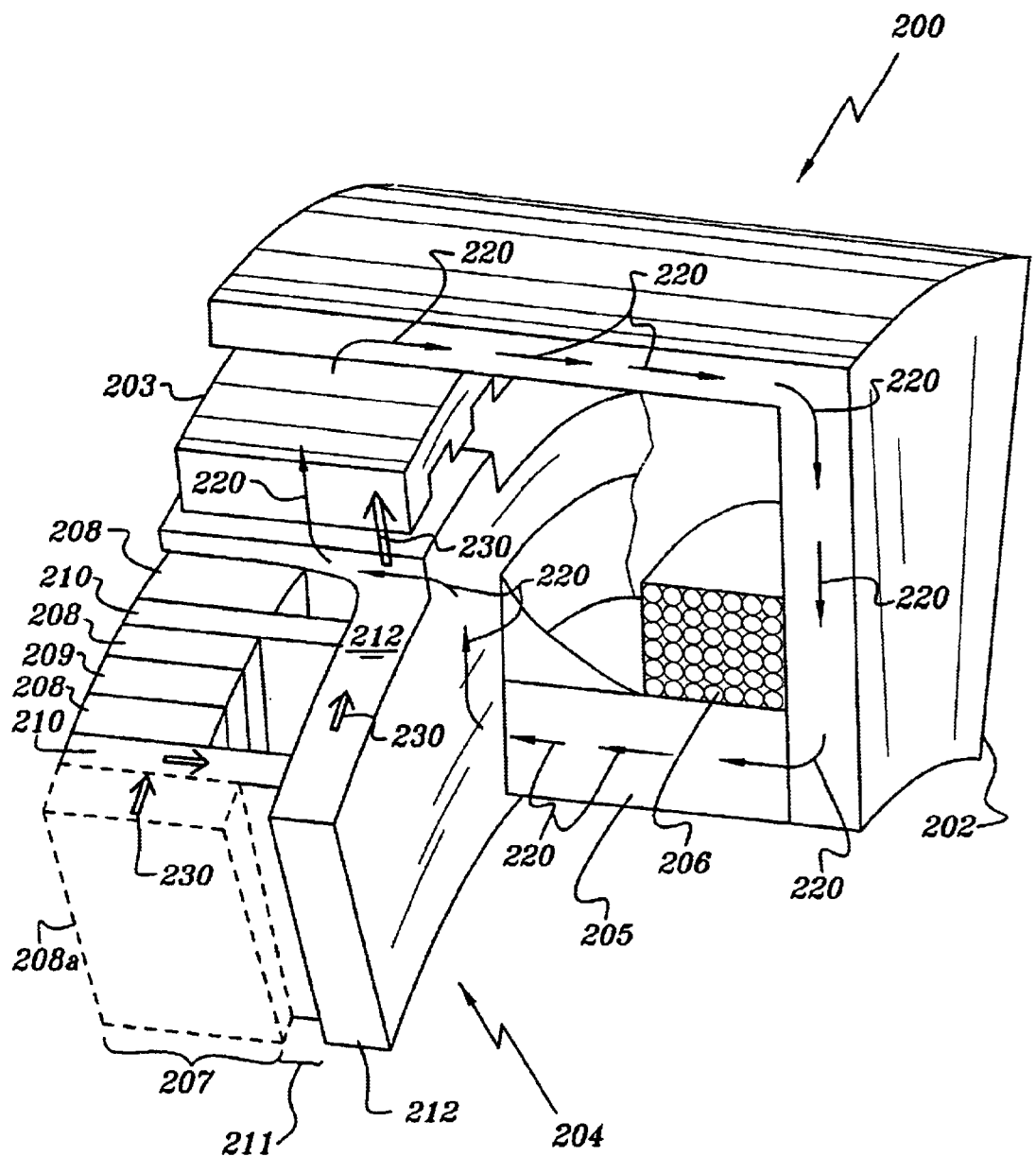
FIG. 4 is a perspective view of a quadrant of a further embodiment of the alternator of the present invention.

Referring to FIG. 4, there is shown a perspective view of one quadrant of another brushless alternator of the present invention which uses claw poles. A typical claw pole structure is described in U.S. Pat. No. 5,892,313, the disclosure of which is incorporated herein by reference. Alternator 200 generally comprises housing 202, stator section 203 and rotor section 204 which function in the same manner as housing 12, stator section 13 and rotor section 14, respectively, previously discussed in the foregoing description. Housing 202 includes lip 205 that circumferentially extends about rotational axis of rotor section 204. Lip 205 extends toward rotor section 204. Alternator 200 further includes excitation winding 206 that functions in the same manner as excitation windings 30 and 32 discussed in the foregoing description. Winding 206 generally comprises a coil wound about lip 205. Rotor section 204 has center section 207 which is comprised of permanent magnets 208 and internal pole pieces 209 and 210 arranged in an alternating orientation in the same manner as magnets 28a–28f and pole pieces 26a–26f discussed in the foregoing description. Magnet 208a is shown in phantom. Magnets 208 and pole pieces 209 and 210 are generally the same in construction as magnets 28a–28f and pole pieces 26a–26f, respectively, previously discussed in the foregoing description. The number of permanent magnets 208 and pole pieces 209 and 210 is the same but can be different than the number of electromagnetic poles of the machine. An air gap (not shown) similar to air gap 15 (see FIG. 1) exists between stator section 203 and rotor section 204.

Referring to FIG. 4, rotor section 204 further includes a pair of radially extending claw poles, one of which being indicated by numeral 212, the other claw pole not being shown. Pole pieces 210 are connected to claw pole 212 and pole pieces 209 are connected to the claw pole not shown. It is to be understood that FIG. 4 is just a partial view (e.g. a quadrant) of alternator 200 and that there are two claw pole sections generally configured as shown in the aforementioned U.S. Pat. No. 5,892,313. An axial air gap 211 magnetically isolates the magnets 208 from claw pole 212. Section 212 is fabricated from magnetically permeable material. The flux produced from the winding 206 is indicated by arrows 220 and lies in a plane that is perpendicular to the plane of rotation of rotor section 204. The flux from permanent magnet 208a is indicated by arrows 230 and flows through claw pole 212 and through the air gap separating stator 203 and rotor section 204. Thus, the magnetic circuits are perpendicular to one another and share the pole piece, but the flux from the permanent magnet does not pass through the winding or visa versa.

Thus, the following features of the present invention provide an alternator that has relatively improved performance and efficiency:

a) the induced magnetic field produced by permanent magnets 28a–f and the induced magnetic field produced by excitation windings 30, 32 have a common magnetic path only inside stator section 13, i.e. the magnetic flux produced by excitation windings 30, 32 does not pass through permanent magnets 28a–28f, and the magnetic flux produced by permanent magnets 28a–28f does not form a loop surrounding excitation windings 30, 32;

b) the flux path of the excitation winding magnetic circuit is perpendicular to the flux path of the permanent magnet circuit outside stator section 13;

c) the flux produced by the excitation windings passes only through two air gaps compared to four in the brushless Lundell-type alternator design;

d) relatively more permanent magnets may be placed upon rotor section 14 since excitation windings 30, 32 are not located on rotor section 14 but rather, are mounted on lips 12a and 12b of housing 12;

e) since no connections between excitation windings 30, 32 and rotor section 14 are required, alternator 10 is brushless thereby eliminating problems relating to performance, wear and replacement of brushes; and f) since the number of magnets 208 can be different than the number of electromagnetic poles of alternator 200, a higher number of magnets will provide a higher flux density in the claw poles.

The principals, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations in changes may be made by those skilled in the art without departing from the spirit of the invention. Accordingly, the foregoing detailed description should be considered exemplary in nature and not limited to the scope and spirit of the invention as set forth in the attached claims.

Thus, having described the invention, what is claimed is:

1. A brushless electric machine, comprising:

a housing comprising two halves separated by a space, the housing being fabricated from a magnetically permeable material and having an interior region;

a stator mounted within the interior region and attached to the housing, the stator having a stator winding;

a rotor mounted for rotation about a rotational axis within the stator, the rotor comprising a plurality of magnetic pole pieces and permanent magnets circumferentially arranged in an alternating configuration such that each permanent magnet is positioned intermediate a pair of consecutive magnetic pole pieces and the axis of magnetization lies in the plane of rotation of the rotor, the rotor being separated from the stator windings by a first air gap so as to form a first magnetic circuit, the rotor further comprising a first side, a first rotor end cap attached to the first side, a second side, and a second rotor end cap attached to the second side, each rotor end cap contacting at least some of the magnetic pole pieces, each rotor end cap being fabricated from a magnetically permeable material; and a pair of excitation windings, each excitation winding being secured to the housing on either side of the rotor such that the excitation winding extends circumferentially in the plane of rotation of the rotor and about a corresponding rotor end cap, the excitation windings being separated from the rotor end caps by a second air gap, the first and second air gaps cooperating to form a second magnetic circuit that does not pass through the permanent magnets of said first magnetic circuit.

2. The brushless electric machine according to claim 1 wherein each rotor end cap has a first end cap portion that is attached to a corresponding side of the rotor and a second end cap portion that is spaced from the corresponding side of the rotor and extends about the rotational axis, each excitation winding circumferentially extending about a corresponding second end cap portion, each excitation winding being spaced from the second end cap portion by a circumferentially extending air gap.

3. The brushless electric machine according to claim 1 wherein each rotor end cap has a first end cap portion that is attached to a corresponding side of the rotor and a second end cap portion that is spaced from the corresponding side of the rotor and extends about the rotational axis, each excitation winding being spaced apart from the first end cap portion by an axially extending air gap.

4. The brushless electric machine according to claim 2 wherein the housing includes an interior wall within the interior region and a pair of lips attached to the interior wall, each excitation winding comprising a circular coil wound about a corresponding lip, each lip being positioned on a respective side of the rotor and circumferentially extending about a corresponding second end cap.

5. The brushless electric machine according to claim 1 wherein each rotor end cap comprises a substantially annular member and wherein the housing further comprises an interior wall within the interior region and a pair of lips attached to the interior wall, each lip having a first lip portion for receiving a corresponding excitation winding and a second lip portion extending from the first lip portion, each lip being positioned on a respective side of the rotor and adjacent to a corresponding rotor end cap such that the rotor end cap circumferentially extends about the second lip portion.

6. The brushless electric machine according to claim 1 wherein the rotor end caps are circumferentially shifted by one pole pitch with respect to each other.

7. The brushless electric machine according to claim 1 wherein each permanent magnet is a ferrite permanent magnet.

8. The brushless electric machine according to claim 1 wherein each permanent magnet is a rare earth magnet.

9. The brushless electric machine according to claim 1 wherein each magnetic pole piece is fabricated from magnetically permeable material.

10. A brushless electric machine, comprising:

a housing comprising two halves separated by a space, the housing being fabricated from a magnetically permeable material and having an interior region;

a stator mounted within the interior region and attached to the housing, the stator having a stator winding;

a rotor mounted for rotation about a rotational axis and spaced apart from the stator windings by an air gap, the rotor comprising a pair of magnetically permeable claw poles, each claw pole comprising a body portion having a circumference and fingers that extend axially from the circumference of the body portion and intermesh with the fingers of the other claw pole, the rotor further comprising a plurality of permanent magnets and a plurality of internal pole pieces intermediate the claw poles and circumferentially arranged in an alternating configuration such that each permanent magnet is positioned intermediate a pair of consecutive pole pieces, the arrangement of the permanent magnets and internal pole pieces defining an outer rotor perimeter and a central opening for receiving a shaft about which the rotor rotates, the plurality of internal pole pieces comprising a first group of internal pole pieces that are attached to one of the claw poles and a second group of internal pole pieces that are attached to the other claw pole, the claw poles being magnetically isolated from the permanent magnets, the fingers of each claw pole being intermediate the stator and the outer rotor perimeter; and a pair of excitation windings, each excitation winding being secured to the housing on either side of the rotor such that the excitation winding extends circumferentially in the plane of rotation of the rotor, the excitation windings being separated from the claw poles by an air gap.

11. The brushless electric machine according to claim 10 wherein the housing includes an interior wall within the interior region and a pair of lips attached to the interior wall, each lip being positioned on a respective side of the rotor and confronting a corresponding claw pole, each lip having a first lip portion that receives a corresponding excitation winding and a second lip portion that extends from the first lip portion in the direction of the corresponding claw pole section.

* * * * *